June 27, 1967 G. C. DE VORE ETAL 3,328,152
GLASS SHEET BENDING MOLD
Filed March 10, 1961 2 Sheets-Sheet 1
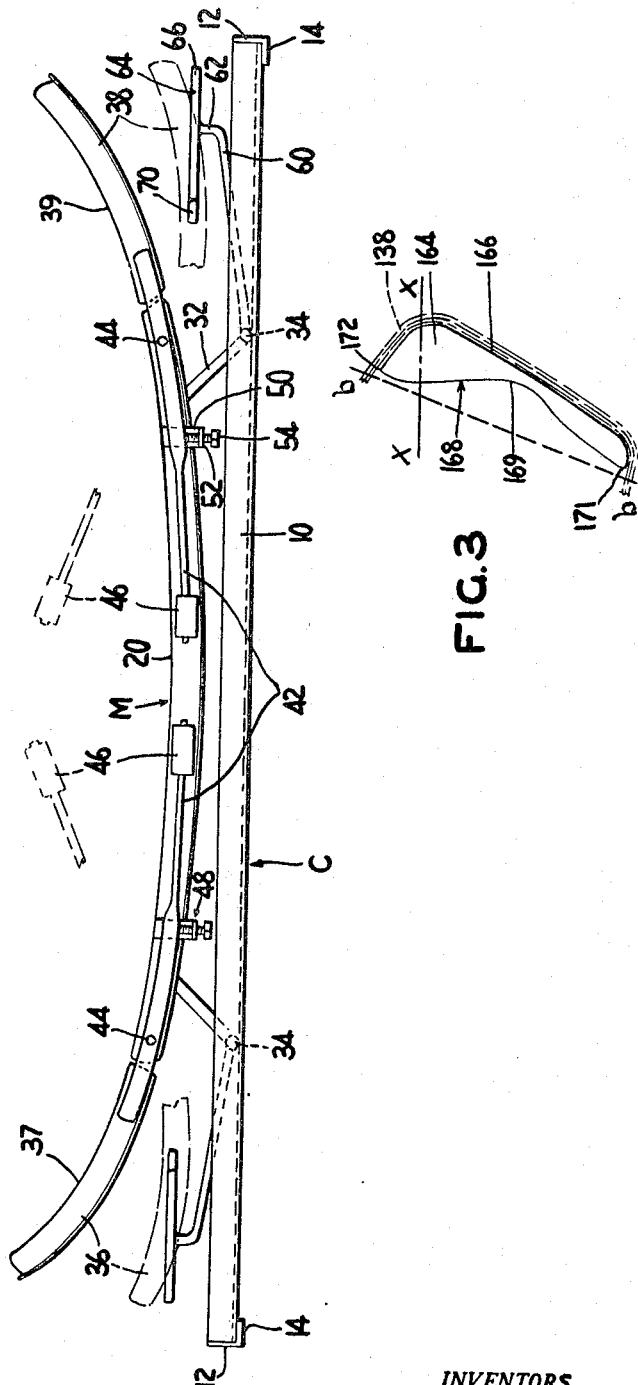
INVENTORS
GUY C. DEVORE and
JAMES W. KAMERER
BY Oscar L. Spencer
ATTORNEY

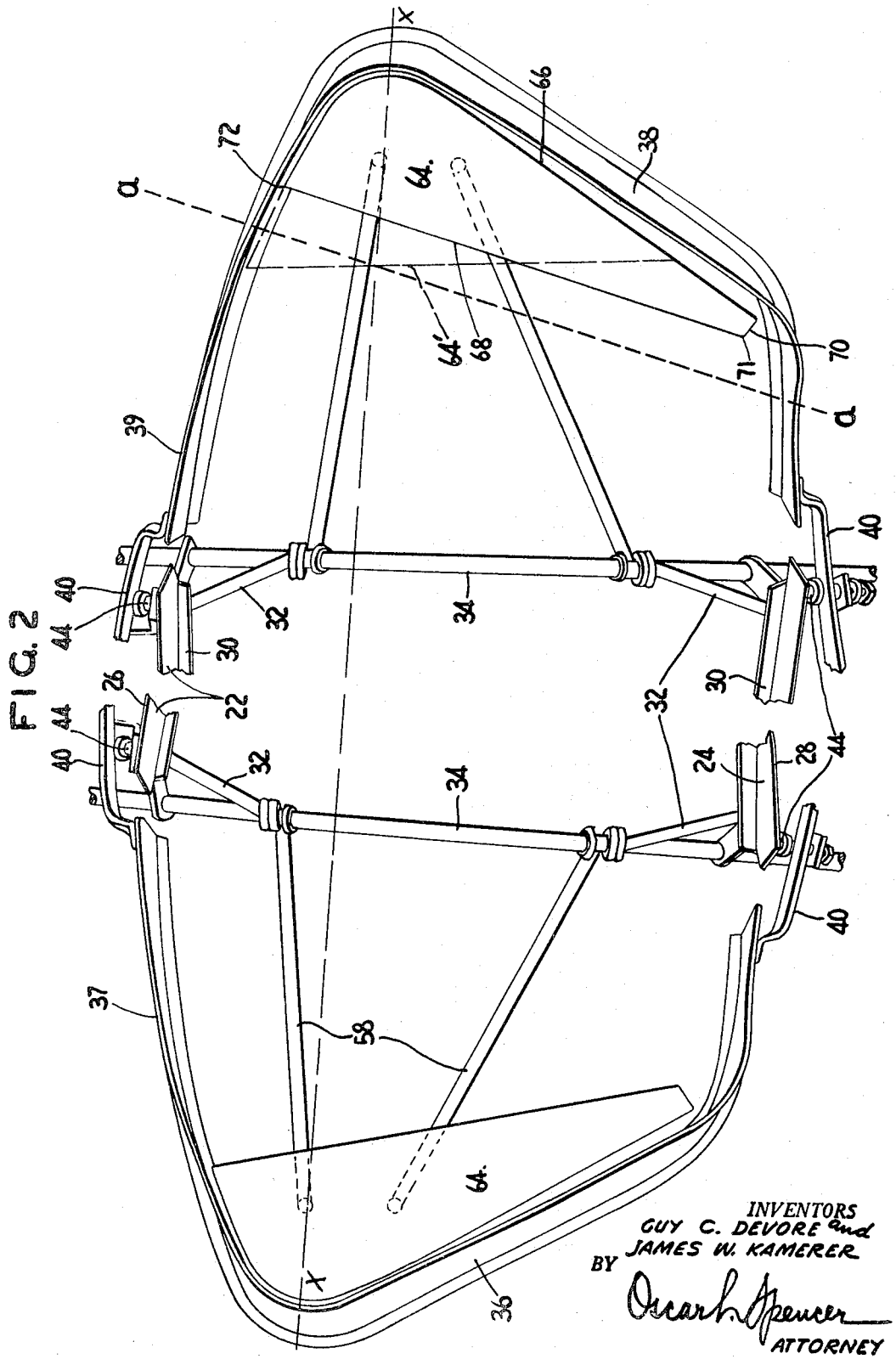

United States Patent Office 3,328,152
Patented June 27, 1967

3,328,152
GLASS SHEET BENDING MOLD
Guy C. De Vore, Cheswick, and James W. Kamerer, New Kensington, Pa., assignors to Pittsburgh Plate Glass Company, Pittsburgh, Pa., a corporation of Pennsylvania
Filed Mar. 10, 1961, Ser. No. 94,752
3 Claims. (Cl. 65—288)

This application is a continuation-in-part of application Ser. No. 606,469 of Guy C. De Vore and James W. Kamerer for Improvement in Glass Sheet Bending Molds, filed Aug. 27, 1956, now abandoned.

This application relates to treating glass and particularly concerns improvements in molds for bending glass sheets to bending curves of varying radius including a relatively flat extremity portion.

In bending glass sheets to complex bending curves such as are required to form modern wrap-around windshields for automobiles, bending techniques have been developed which involve the use of sectionalized molds of skeleton configuration. The most effective molds of this type are concave in elevation and comprise a central molding member comprising spaced rails flanked by pivotable wing members comprising reversely curved rails which rotate into a spread mold position wherein the spread mold supports the glass sheet as a beam adjacent its longitudinal extremities and at some intermediate point or points. The wing members are preferably counterweighted to rotate upwardly.

When glass laden molds are subjected to glass softening temperatures, the central portions of the glass sheets sag to conform to the upper shaping surface of the central molding member rail while the wing members rotate into a closed mold position to form a substantially continuous open frame conforming in elevation and contour to the shape desired for the bent glass, thus lifting the heat-softened glass sheet extremities from flat to curved configuration.

Where glass sheets are to be bent to curvatures which include flat extremities, the placement of heat abstractor members having a high heat capacity per unit area relative to the mold members beneath the extremities of the wing members has resulted in keeping the tips of the glass sheets to be bent from attaining glass softening temperatures, thus causing the latter to remain relatively flat compared to the other portions of the glass sheet. The incorporation of heat abstractor members has provided a satisfactory solution for overbending glass tips. Heat abstractor members typical of the prior art include solid metal plates having a thickness in the range of between about ¼ to ½ inch and may be fabricated of cold rolled steel having a thermal capacity of about 0.11 calorie per gram per degree centigrade at 15° C.

If the glass sheets are softened uniformly, i.e., in the absence of the use of heat abstractor members, rotation of the wing sections, tends to cause each of the glass extremities to fold upwardly about axis of curvature that is normal to a line connecting the point of application of the upward force and the center of gravity of the lifted glass tip area. Prior to the present invention, the flat glass industry was oblivious to this bending tendency and the moderating effect resulting from the proximity of heat abstractor members to the flat glass extremities.

A particular problem in producing bends has been encountered when the force exerted by the extremities of the wing members on the tips of the glass as the wing members rotate to a closed mold position is in a direction oblique to a transverse axis connecting the points of most severe longitudinal bending. In such cases, the forces exerted by the wing sections of the bending mold cause the glass tips to start bending about axes that are not parallel to the axes of the desired bends. This condition occurs when the glass sheets are bent to cylindrical shapes and the glass sheet extremities are located to one side of a longitudinal axis passing through the center of gravity of the entire sheet. It also occurs when the line connecting the point of application of the upward force on the glass tips and the centers of gravity of the lifted glass tip area lies in a direction oblique to the axis of curvature defined by the points of sharpest longitudinal bending.

The wing sections assume their closed mold positions before the glass sheets reach their final shape. The final bend is completed when the heat-softened glass sheets sag by gravity to assume the curvature defined by the mold shaping surface. When the initial bend caused by upward rotation of the wing sections causes each tip of the glass sheet to bend along an axis that is at an angle to its desired ultimate curve, it is necessary for this axis of curvature to be changed into the proper curvature during the latter stages of the bending cycle characterized by heat sagging alone.

Since a bent structure has greater resistance to deformation than a flat structure, the originally incorrectly bent portion offers more resistance to deformation during completion of the bending cycle by heat sagging alone than if an incorrectly oriented bend had never been started in the first place. Hence, it is impossible to correct completely a bend that has begun about an incorrect axis. Instead, when an incorrect axis of curvature has been started in the glass, some buckling of the glass sheet occurs at this critical portion where it is necessary to change the direction of the axis of minimum glass curvature.

Where two glass sheets are stacked and bent simultaneously as in fabricating bent windshields, the areas of buckling are different for the two sheets. This results in the formation of pockets or areas where the two bent sheets are not in intimate contact. When plastic is introduced between the bent sheets and the assembly is laminated, rejects occur frequently because many of these pockets do not press out during lamination or because the glass sheets are fractured in the buckled areas.

The present invention provides criteria for constructing the heat absorber members presently used to control overbending of the tips of the glass sheets so that the bending caused by the upward mechanical pressures imposed at the extremities of the glass sheets by the wing members of the mold causes the glass tips to bend about desirable rather than undesirable axes of rotation, namely, those parallel to the ultimate axes of bending defined by connecting the points of sharpest longitudinal bending across the glass sheet. We have found that the absorber member should be so located that it is immediately beneath the extremity of the wing member when the latter is rotated into the spread mold position to receive flat glass sheets for bending. The heat abstractor member should preferably be constructed to conform to the contour of the tip of the glass sheet at its outboard edge shrunken slightly to provide clearance for the bending mold extremity, and a line connecting the lateral extremities of its inboard edge should extend transversely of the bending mold along an axis that is substantially parallel to the axis connecting the points at which each longitudinally extending strip of the glass sheet is bent most sharply. These latter points define and are referred to hereinafter as an axis of minimum radius of curvature.

The inboard edge of the heat abstractor member is located slightly outboard of the axis connecting the loci of points of minimum radius of bend. The inboard extremity may be either straight or curved depending upon the nature of the transverse bend desired at the sharpest longitudinal bend area or the width of the sheet bent.

Particular embodiments of the present invention will be described in detail for purposes of illustration. In the drawings forming part of the description of the illustrative embodiment, FIGURE 1 represents an elevational view of a bending mold provided with heat abstractor members constructed according to the teachings of the present invention.

FIGURE 2 is an enlarged plan view with elements of the structure omitted showing in further detail how the structure of the heat absorbing member according to the present invention compares with prior art structures.

FIGURE 3 is a plan view of an alternate embodiment of heat abstractor member showing its relation to a portion of an open mold depicted in phantom.

Referring to the drawings, reference character M refers to a bending mold generally and reference character C refers to a carriage which is used to carry the bending mold through a tunnel-like lehr where the temperature of glass sheets is gradually increased until the glass reaches the glass softening temperature.

Carriage C comprises a pair of longitudinally extending L-beams 10 interconnected by cross beams 12. The latter cross beams 12 may include bottom flanges 14 which ride on top of conveyor rails (not shown) when the carriage and mold supporting a glass sheet for bending are conveyed laterally through a bending lehr.

Bending mold M comprises a central molding section 20 including spaced rails 22 and 24 extending longitudinally of the mold. Rail 22 has an upper shaping surface 26 and rail 24 has an upper shaping surface 28 conforming to the shape desired for the sides of the central portion of the glass sheets. The rails 22 and 24 are reinforced by reinforcement strips 30 attached to the bottom thereof.

Braces 32 extend obliquely downwardly from adjacent the extremities of the rails 22 and 24. The braces terminate at their bottom ends in cross bars 34 to which they are attached. The latter, in turn, are received by the horizontal flanges of the L-shaped beams 10 and thus support the mold in spaced relation above carriage C.

Flanking the outboard extremities of the center mold section 20 are wing members 36 and 38, having upper shaping surfaces 37 and 39, respectively, each enclosing a relatively flat area portion of the mold shaping surface that is bent sharply relative to the central area portion of the mold shaping surface extending between rails 22 and 24. These wing members each are attached at their inboard extremities to curved straps 40. The latter terminate in counterweighted arms 42 each of which rotates about pivots 44 with its associated strap and wing member. The pivots 44 include a bearing element attached in fixed relation to the center mold sections 20, preferably adjacent the longitudinal extremities of mold rails 22 and 24. Counterweights 46 which are attached to the inboard extremities of the counterweighted arms 42 are of such a size as to force the wing members 36 and 38 to be rotated upwardly whenever the supported unbent glass has softened sufficiently to permit its tips to flex in response to the bending moments applied about the pivots 44.

Conventional stop members 48 are attached to the mold rails 22 and 24 inboard of the pivots 44 to stop the rotation of the wing members 36 and 38 when they have rotated into the desired closed mold position. Upper shaping surfaces 26, 28, 37, and 39 define a substantially continuous frame conforming in elevation and outline to the shape desired for the bent glass sheet in the closed mold position.

Stop members 48 comprise a depending flange 50 attached at their upper extremity to a mold rail 22 or 24 and terminating at their bottom extremity in an apertured flange 52. A set screw 54 is threaded through the aperture of the apertured flange 52 to provide an abutment against which the bottom of a corresponding counterweighted arm 42 comes into contact when the rotation of the wing members has been completed.

A pair of J-shaped support rods 58, which include a horizontal portion 60 and a vertical portion 62 as seen in FIGURE 1, extend outwardly of each cross bar 34. Attached to the upper extremities of the vertical portion 62 are heat abstractor members 64 composed of masses of heavy metal having a relatively high heat capacity compared to the adjacent portions of the mold. The heat abstractor members 64 (shown in solid lines at both ends of the mold seen in plan in FIGURE 2) are constructed differently from heat abstractor members previously used in the art such as depicted by the dotted lines as shown by reference character 64' to the right of FIGURE 2.

The heat abstractor member according to the present invention has an outboard edge 66 that is shaped to conform substantially with the periphery at the longitudinal extremity of the open wing members 36 or 38. In the open mold position, the wing members appear to embrace the outboard edges of the heat abstractor members when viewed in plan.

The inboard edge 68 of the heat abstractor members 64 extends between lateral extremities 71 and 72 which define a line extending substantially parallel to the transverse axis connecting the points at which each longitudinally extending strip of the glass sheet is bent most sharply. As aforesaid, these points define the axis of minimum radius of curvature of the glass sheet. The inboard edge of the heat abstractor members terminate slightly outboard of the axis of minimum curvature such as depicted by the line a—a at the right-hand side of FIGURE 2. For glass sheets ranging in length to 90 inches to be bent to sharpest curvatures of 5 inch radii, it is preferable that the inboard edges be within 4 inches of the vertical plane including the axis connecting the points of most severe bending. A separation of 2 inches works exceptionally well. A small connecting edge 70 is formed by cutting away one side of heat abstractor member 64 in order to provide clearance for the wing members 36 and 38 to rotate from the spread position depicted in phantom lines in FIGURE 1 for the extremities of the mold to the closed mold position depicted by the solid lines in FIGURE 1.

The inboard edge 68 of the heat abstractor member 64 need not necessarily be straight as depicted in FIGURE 2. In fact, in bending glass sheets of increased widths it has been found to be desirable to shape the inboard edge of the heat abstractor members concavely in the manner exemplified in FIGURE 3.

In this embodiment, a heat abstractor member 164 is shown having an outboard edge 166 shaped to conform substantially to the periphery of the outboard extremity of a wing member 138 shown in phantom. The inboard edge 168 of the heat absorber member 164 is curved concavely to provide a recessed central portion 169. However, a line interconnecting the lateral extremities 172 and 171 of the inboard edge 168 of the heat abstractor member 164 is substantially parallel to an axis b—b connecting points of most severe curvature.

The concavity 169 in the inboard edge 168 of the heat abstractor member 164 serves to inhibit the formation of a reverse curvature transversely of the sheet in the vicinity of the wrap-around portion of the bend. This reverse curvature occurs when the heat capacity per unit length of the heat abstractor member 164 along its inboard edge is uniform. Consequently the edges of the glass sheet in the vicinity of the lateral extremities of the inboard edge 68 tend to sag while the central portion of the glass tends to remain stiff because of the large surface of the glass sheet edges exposed to the ambient lehr heat. By curving the inboard edge of the heat abstractor member in the manner depicted in FIGURE 3, the relative moderating effect of the heat abstractor member is equalized across the sheet in the vicinity of its wrap-around portion of the bend. Therefore, for very wide sheets where the disparity in heat retention per unit mass across the width of the sheet is accentuated, it is preferred to have the inboard edge of the heat abstractor member formed of a concave shape.

Heat abstractor members 64 or 164 may be composed of solid plates of cold rolled steel having a carbon content not over one percent by weight and the remainder iron and a thickness usually between about ¼ inch and about ½ inch. Such members have a thermal capacity of about 0.11 calories per gram per degrees centigrade at 15° C. Other materials having substantially higher thermal capacity per unit area than that of the end area portion enclosed by the end shaping members 36, 38 of the mold may be employed.

In both embodiments described above, the entire heat abstractor member 64 or 164 is located outboard of the axis a—a or b—b connecting the points of most severe curvature. If the heat abstractor member extends inwardly beyond the axis connecting points of most severe curvature, the initial mechanically actuated bend is imposed on the glass in a region that ultimately is desired to be maintained relatively flat to form a kink inboard of the wrap-around bend. Since it is difficult to iron out any kink thus formed by subsequent steps, it is preferred to have the heat abstractor members located outside such axes.

It is noted from FIGS. 2 and 3 that inboard edge 68 of heat absorber 64 and the line connecting the lateral extremities 171 and 172 of the inboard edge 168 of heat absorber 164 must extend obliquely of the longitudinal axis X—X of the mold to be parallel to the axes a—a and b—b, respectively. In the past, the inboard edge of the heat absorbers 64' extended in a direction normal to the longitudinal axis of the mold regardless of the angle the axis of minimum curvature made with the longitudinal mold axis. Thus, the inboard edge of such prior art heat absorbers extended obliquely of the axis of sharpest bend desired of the glass sheet. Specifically, in such prior art structure, the inboard edge extended normal and transverse to the longitudinal axis of the mold, whereas the sharp bend was desired along an axis extending obliquely and transversely of the longitudinal axis of the mold.

Prior to the present developments, kinking had accompanied bending and an extraordinary amount of breakage occurred during lamination when molds provided with heat abstractor members constructed as depicted by reference character 64' at the right-hand side of FIGURE 2 were used. Until the present invention a considerable proportion of rejects were produced. Without changing the rate of production, and merely by changing the construction of the heat abstractor members from the shape depicted by element 64' to that of element 64, the frequency of production rejects was reduced by 40 percent. When sheets of increased width were required to be bent, the change of structure of the inboard edge from the straight sided structure of heat abstractor 64 to the concave inboard edge 168 of heat abstractor member 164 provided a solution for the elimination of unwanted reverse transverse sagging.

What is claimed is:

1. A glass sheet bending mold adapted to bend an elongated glass sheet in a hot atmosphere and comprising an upper shaping surface of skeleton configuration conforming in elevation and outline to the shape of the bent glass sheet, said shaping surface enclosing a relatively flat area portion bent sharply relative to another portion of the shaping surface about an axis extending obliquely of the longitudinal axis of the mold, and a heat absorbing member located in spaced relation below and in facing relation to said relatively flat area portion enclosed by the mold, said heat absorbing member including an inboard edge whose lateral extremities define a line extending obliquely of the mold in a direction substantially parallel to said obliquely extending axis, wherein the heat absorbing member lies outside said obliquely extending axis and wherein the inboard edge is curved so that it is spaced a greater distance from said axis intermediate its lateral extremities than at its lateral extremities.

2. A glass sheet bending mold adapted to bend an elongated glass sheet in a hot atmosphere and comprising an upper shaping surface of skeleton outline conforming in elevation and outline to the shape of the bent glass sheet, said shaping surface enclosing a relatively flat extremity portion bent sharply relative to another flat area along a bending curve of varying radius, and a heat absorbing member located in spaced relation below and facing said relatively flat extremity portion, said heat absorbing member having an inboard edge extending transversely of said mold and outwardly of said bending curve, said inboard edge having extremities defining a line extending substantially parallel to the axis of said bending curve, wherein said inboard edge is curved concavely to provide a recessed central portion for said inboard edge located a greater distance longitudinally outboard of said axis than the extremities of said inboard edge.

3. The structure according to claim 2, wherein the outboard edge of the heat absorber member is similar to the outline of the adjacent mold extremity.

References Cited

UNITED STATES PATENTS 2,861,396 11/1958 Richardson _____ 65—291

FOREIGN PATENTS 201,257 3/1956 Australia.
534,184 10/1955 Italy.

DONALL H. SYLVESTER, *Primary Examiner.*

D. CRUPAIN, A. D. KELLOG, *Assistant Examiners.*